Oct. 25, 1932.  F. H. NULLMEYER  1,884,149
WELDING ROD
Filed March 2, 1928
Fig. 1.
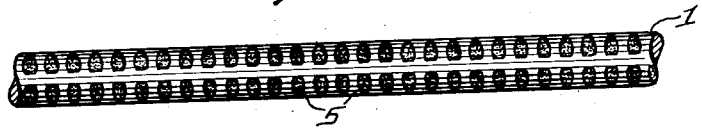
Fig. 2.
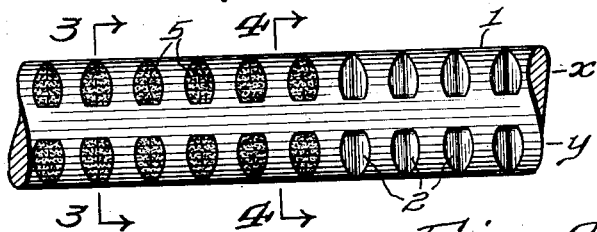
Fig. 3.  Fig. 4.
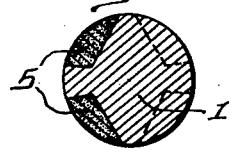 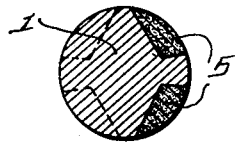
Fig. 5.
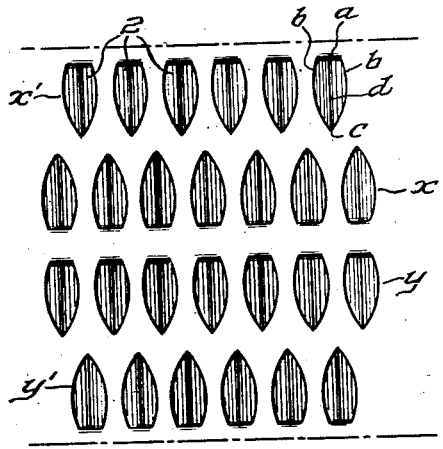
INVENTOR
Frank H. Nullmeyer.
BY
ATTORNEYS
WITNESS Patented Oct. 25, 1932

1,884,149

UNITED STATES PATENT OFFICE

FRANK H. NULLMEYER, OF YOUNGSTOWN, OHIO, ASSIGNOR TO THE YOUNGSTOWN SHEET AND TUBE COMPANY, OF YOUNGSTOWN, OHIO, A CORPORATION OF OHIO

WELDING ROD

Application filed March 2, 1928. Serial No. 258,470.

The present invention relates to metallic rods or wires employed in welding operations requiring the use of fluxes. In such operations the rods are introduced with the necessary fluxing material into a heated welding zone produced by the welding torch or arc to thereby melt the metal of the rod in the presence of the flux with resulting formation of the weld.

To this end it has heretofore been customary to coat the rod with the fluxing material either during the manufacture of the rod or just prior to its being used in forming the weld so that as the rod is progressively brought into and melted in the welding zone, the fluxing material will likewise be progressively carried into the zone along with the rod. Where the welding is being performed by means of an acetylene or other torch this method of applying the flux is satisfactory. It is not so, however, in electric welding where the rod itself forms one of the electrodes between which the arc is struck since the presence of the flux coating on the rod prevents the making of the requisite substantially perfect electrical contact between the rod and the conductor by means of which, whatever be its nature, the current is brought to the rod. It has therefore been usual in the electric welding to employ flux coated rods of relatively short length and to scrape off or otherwise remove the coating from that part of the rod—usually the rear end thereof—where the conductor is to be connected or else to initially coat the rods for a portion of their length only so as to leave one end uncoated for connection of the conductor. This results in a considerable loss of time and resulting expense in cleaning the rods where they are fully coated initially and enhances the cost of manufacture where the rods are only coated for a portion of their length; additionally, the uncoated portion of the rod being devoid of flux cannot be used for the actual welding so that after the coated portion of the rod is used up the uncoated portion must be thrown away with resulting loss. A further disadvantage arises from inability to satisfactorily employ in electric welding a fully coated rod of indefinite length coiled on a spool or the like from which it may be drawn as required, for, under these conditions, the necessary electric contact cannot be maintained through the flux as the rod is progressively drawn over the contactor or other means designed to convey the current to the rod.

It is therefore a principal object of my invention to provide a welding rod having fluxing material disposed in spaced indentations formed in its surface in such manner that satisfactory electric contact may be established with said surface at any desired point.

A further object of my invention is to provide a welding rod which while adapted to retain a predetermined quantity of fluxing material and to carry it into the welding zone yet is of such character that satisfactory electric contact can be made with the rod at any desired point on its surface or progressively as the rod is moved past a suitable contactor.

A still further object of the invention is to provide a rod of the character aforesaid which may be manufactured at a cost not materially higher than the fully coated rods heretofore in use and which may be satisfactorily employed for electric welding in short lengths without the necessity for removing the fluxing material adjacent the point where the electric connection is to be established with the rod, or which may be formed in rolls or coils of indefinite length and drawn therefrom through the welding machine as required in the welding operation while maintaining a satisfactory electric contact with the surface of the rod.

My invention further includes other objects and novel features hereinafter more particularly mentioned or which will be apparent to those familiar with the art from the following description of a rod formed in accordance with my invention in its preferred embodiment and illustrated in the accompanying drawing.

In the said drawing Fig. 1 is an elevation of a section of the rod; Fig. 2 is also an elevation thereof but on a considerably larger scale, this figure showing the rod both in its finished form, that is, after the flux has been introduced into the indentations in the surface of the rod and also in unfinished form, that is, before the introduction of the flux. Figs. 3 and 4 are respectively transverse sections of the finished rod on lines 3—3 and 4—4 in Fig. 2, while Fig. 5 is a fragmentary view showing the surface of the unfinished rod developed into a plane. The same symbols are used to designate like parts in the several figures.

As shown, the rod comprises a body 1 of metal having a composition suitable for the particular kind of welding for which the rod is designed to be employed, the body, as usual, being of cylindrical cross section and of any desired length. Ordinarily it is found convenient to initially draw or otherwise form the body with a smooth unbroken cylindrical surface and to the desired diameter by any of the usual and well known methods employed for the manufacture of wires or rods and to then form in the surface of the body a plurality of spaced indentations by passing it through rolls having teeth or projections of suitable contour. Preferably each of these indentations, generally designated as 2, in shape conforms at the surface of the body substantially to a more or less conventional spear head and thus comprises a straight edge $a$ extending parallel to the axis of the rod and oppositely disposed side edges $b$—$b$ respectively curving first outwardly from the ends of the edge $a$ and then inwardly to meet at a point $c$. From the edges $b$, the sides or faces of the indentations converge downwardly and inwardly to meet in a line $d$ extending transversely to the axis of the rod, while from the edge $a$ the end face of the indentation extends downwardly and inwardly in an approximately radial direction. I have found that indentations of this general form are eminently suitable for their intended purpose providing, as they do, a relatively considerable extent of surface for adhesion of the fluxing material which is desirable in that it assists in retaining the material in the indentations during transportation and handling of the rod, while, additionally, they do not materially weaken the rod when arranged as hereinafter described and can be readily formed by the use of rolls provided with suitable teeth or projections.

In accordance with the preferred practice of my invention the maximum depth of each indentation measured inwardly from the surface of the rod approximates or is a little less than one-fourth of the diameter of the latter but of course the depth and size of the indentations may be varied somewhat in accordance with the amount of flux which it is desired to embody in the rod for each unit of its length and this consideration will also largely determine the longitudinal spacing between the indentations.

The indentations are preferably arranged in longitudinally extending rows, four of which are ordinarily employed and spaced symmetrically about the circumference of the rod. From an inspection of the drawing it will be apparent that in accordance with the preferred practice of the invention the straight edges $a$ in one adjacent pair of these rows, designated as $x$ and $y$, are arranged adjacent each other and that a similar arrangement is utilized in the other pair of rows $x'$—$y'$, while moreover, the indentations in each pair of rows are aligned with each other transversely of the rod but are in staggered relation with the indentations in the other pair of rows. Thus when viewed as in Figs. 1 and 2 in which the rows $x$ and $y$, for example, are visible, the respective indentations in these rows are in transverse alignment with each other but point in opposite directions; if, however, the rod be rotated 90° from this position in either direction, the indentations in the rows then visible would be in respectively staggered relation with their points $c$ extending toward each other. I have found that this arrangement and disposition of the indentations is desirable in that, among other things, it results in leaving a portion of the surface of the body of the rod exposed throughout its length and minimizes the weakening of the rod and any tendency which it might otherwise have to fracture transversely at predetermined points.

After the indentations have been formed the body of the rod appears as shown at the right hand end of Fig. 2 and is now in condition to receive the fluxing material, designated as 5, which may be applied in any suitable way, conveniently by drawing the rod through a mass of the material while in plastic or semi-liquid form so as to coat the rod thoroughly therewith and then passing it through a die to remove the excess material from the surface of the rod and expose and clean the latter while consolidating the material in the indentations and insuring its adherence to the sides and ends thereof. Under certain conditions it may then be desirable to bake or otherwise treat the rod to effect further consolidation and drying of the fluxing material which is generally of a siliceous character although, of course, any desired fluxing material may be employed.

Under practical conditions it is found that a rod constructed in accordance with my invention can be shipped and handled in the same way as the fully coated rods heretofore employed without causing an appreciable amount of the fluxing material in the indentations to become loosened or displaced while, as heretofore pointed out, by reason of the exposure of a portion of the surface of the rod throughout its length either a permanent or relatively moving electrical connection can be made at any point on the rod, thus enabling the latter to be used satisfactorily in substantially any form of electrical welding apparatus. It will of course be appreciated that use of the rod is not, however, confined to such apparatus as it may be employed if desired in acetylene or other gas welding operations, affording as it does a convenient way of carrying the fluxing material into the welding zone; the primary utility of the rod however, as above pointed out, resides in its use in electric welding.

While for convenience I have frequently herein employed the word "rod" when speaking of the electrode, I do not thereby intend to exclude from the scope of the invention those electrodes of relatively small diameter which are more usually referred to as "wires" than as rods, and it will thus be understood that both of said terms are herein used in a generic as distinguished from a specific sense.

I desire it to be further understood that the present invention is not limited or confined to the specific example thereof herein disclosed, but may be practised in various other ways within the scope of the following claims.

Having thus described my invention, I claim and desire to protect by Letters Patent of the United States:

1. A welding rod comprising a metal body having a plurality of substantially spear-shaped indentations in its surface arranged in longitudinal spaced relation in four longitudinally extending rows disposed symmetrically about the body, the indentations in adjacent pairs of rows being disposed in opposite directions transversely of the rod and in longitudinally staggered relation with respect to the corresponding indentations in the other pair of rows.

2. A welding rod comprising a metal body having a plurality of indentations arranged in longitudinally extending rows disposed symmetrically about the body, the surface of the rod between the sides of adjacent rows being substantially uninterrupted longitudinally thereof, each of said indentations being included at the surface of the body between a pair of curvilinear edges converging in the direction of an adjacent row and the opposite walls of each of said indentations converging within the rod in a line extending substantially normal to the axis thereof, and fluxing material filling said indentations substantially level with the non-indented surface of the rod.

In witness whereof, I have hereunto set my hand this 14 day of February, 1928.

FRANK H. NULLMEYER.